United States Patent
Joecker et al.

(10) Patent No.: US 8,605,950 B2
(45) Date of Patent: Dec. 10, 2013

(54) CAMERA AND CORRESPONDING METHOD FOR SELECTING AN OBJECT TO BE RECORDED

(75) Inventors: Dieter Joecker, Burgthann (DE); Alexander Wuerz-Wessel, Stuttgart (DE); Jens Schick, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 13/120,865

(22) PCT Filed: Sep. 21, 2009

(86) PCT No.: PCT/EP2009/062193
§ 371 (c)(1), (2), (4) Date: Aug. 8, 2011

(87) PCT Pub. No.: WO2010/037655
PCT Pub. Date: Apr. 8, 2010

(65) Prior Publication Data
US 2011/0280444 A1     Nov. 17, 2011

(30) Foreign Application Priority Data
Oct. 2, 2008   (DE) .................. 10 2008 042 562

(51) Int. Cl.
*G06K 9/00* (2006.01)

(52) U.S. Cl.
USPC ........................................................ 382/107

(58) Field of Classification Search
USPC ................................................. 382/100–107
See application file for complete search history.

(56) References Cited

U.S. PATENT DOCUMENTS

| | | |
|---|---|---|
| 5,430,480 A | 7/1995 | Allen et al. |
| 2005/0028070 A1 | 2/2005 | Lin et al. |
| 2005/0163348 A1 | 7/2005 | Chen |
| 2005/0280707 A1 | 12/2005 | Sablak et al. |
| 2006/0078162 A1 | 4/2006 | Wonneberger |
| 2008/0143840 A1* | 6/2008 | Corkum et al. ............ 348/208.6 |
| 2008/0186386 A1 | 8/2008 | Okada et al. |

FOREIGN PATENT DOCUMENTS

| | | |
|---|---|---|
| EP | 0 560 610 | 9/1993 |
| EP | 1 427 212 | 7/2004 |

* cited by examiner

*Primary Examiner* — Atiba O Fitzpatrick
(74) *Attorney, Agent, or Firm* — Kenyon & Kenyon LLP

(57) ABSTRACT

A camera is described having an image capturing device, an evaluation and control unit and a storage unit, the evaluation and control unit analyzes an image sequence having at least two successively captured images recorded by the image capturing device to segment and stabilize at least one object to be recorded during the image recording. The evaluation and control unit ascertains a deliberate panning movement of the camera and compares it with ascertained movements of objects represented in the captured images, the evaluation and control unit determining at least one object as an object to be recorded, the ascertained movement of which is most consistent with the camera's ascertained panning movement, and the evaluation and control unit storing an image section of the image captured by the image capturing device in the storage unit which represents the at least one object to be recorded. Also described is a corresponding method.

10 Claims, 1 Drawing Sheet

CAMERA AND CORRESPONDING METHOD FOR SELECTING AN OBJECT TO BE RECORDED

FIELD OF THE INVENTION

The present invention relates to a camera and a corresponding method for selecting an object to be recorded.

BACKGROUND INFORMATION

Frequently, a camera is used to record moved scenes freehand. If an object that moves independently is located in the scene to be recorded, the camera must be tracked corresponding to the movement of the object. Even professional camera operators have only limited success with this tracking or the associated deliberate panning movement of the camera. For the stable tracking of the camera, the movement of the object should be measured or ascertained. For this, it is necessary for the moved object to be segmented in the successively recorded images. Apart from the desired object to be recorded, other moved objects which have similar or different movements or a static background may also be segmented from the analysis of the recorded images. Since a plurality of objects may be discovered in the recorded images, additional information is therefore required for the selection of the desired object. This information may be input, for example, using an appropriate user menu; however, this results in the loss of the desired tracking in the case of fast moving objects.

An image stabilization system and a corresponding method for a video camera are discussed in unexamined patent application US 2005/028070 A1. The described image stabilization system for automatic tracking includes a camera having an image capturing device which records a video image. The camera has a selectively adjustable image area. A processing unit is operatively coupled to the camera and receives signals which include the image area of the camera and the recorded images. In the captured images, the processing unit automatically tracks the movements of at least one object and determines a stabilization setting for the recorded video image as a function of an inadvertent change in the image area of the camera during a time interval between the recording of a first image and the recording of a second image. The determination of the stabilization setting is based on the signals which indicate the image area and an analysis of the first and second image.

SUMMARY OF THE INVENTION

The camera according to the exemplary embodiments and/or exemplary methods of the present invention having the features described herein has the advantage over the related art that an evaluation and control unit ascertains a panning movement of the camera and compares it with ascertained movements of objects which are represented in the images captured by an image capturing device, the evaluation and control unit determining at least one object as an object to be recorded, the ascertained movement of which is most consistent with the ascertained panning movement of the camera, and the evaluation and control unit storing an image section of the image captured by the image capturing device in a storage unit, the image section representing the at least one object to be recorded.

The method according to the present invention for selecting an object to be recorded having the features described herein has the advantage over the related art that a panning movement of the camera is ascertained during the image recording, movements of objects being ascertained in the captured images and compared with the camera movement, at least one object being determined as an object to be recorded, the ascertained movement of which is most consistent with the ascertained panning movement of the camera, and an image section of the captured images being stored, the image section representing the at least one object to be recorded.

The camera according to the present invention and the method according to the present invention make it possible to automatically hold the desired object to be recorded, which the user advantageously tracks, for example, by a deliberate panning movement of the camera, in the stored image section. Since by manually tracking the camera, the user attempts to hold the desired object nearly constantly in the image section to be recorded, the desired object has nearly the same movement parameters as the camera, so that the camera movement may be used advantageously as a selection criterion. Since the manual tracking is insufficiently precise and the image is often blurred during tracking, it is of particular benefit to stabilize the image section having the desired object to be recorded by using appropriate known stabilization methods.

The measures and refinements listed in the further description herein make it possible to achieve advantageous improvements on the camera specified herein and on the method specified herein for selecting an object to be recorded.

It is advantageous in particular that the evaluation and control unit digitally evaluates the recorded image sequence for ascertaining an optical flow, the evaluation and control unit evaluating the ascertained optical flow in order to generate information concerning the panning movement of the camera and/or concerning the movements of the objects in the images. The evaluation of the optical flow makes it possible to recognize and segment image areas having the same direction of movement in the captured image. To generate the information concerning the camera movement, the evaluation and control unit may, for example, evaluate the ascertained optical flow of a recognized image background. Alternatively, the deliberate panning movement of the camera may be detected by a sensor unit which transfers information concerning the camera movement to the evaluation and control unit for evaluation. In digital image processing technology, "optical flow" is understood to be a vector field which specifies for each pixel the two-dimensional movement of the corresponding pixel in an image sequence.

In one embodiment of the present invention, the resolution of the images captured by the image capturing device is significantly greater than the resolution of the images stored in a storage unit. This advantageously makes it easier to recognize moved objects which carry out the same movement as the camera.

In another embodiment of the present invention, the evaluation and control unit establishes a focus of the at least one object to be recorded as a central point of the image section to be recorded and scales the size of the image section to be recorded to the size used in the storage unit. The central point and the size of the image section to be stored are calculated using the distribution of the selected objects.

In another embodiment of the present invention, a common focus is established as a central point of the image section to be recorded and/or an object is filtered out using a temporal filter if a plurality of objects is determined having the same direction of movement as objects to be recorded. This makes it possible to use the ascertained central point of the selected objects also for stabilizing the image section.

Exemplary embodiments of the present invention are represented in the drawings and are elucidated in greater detail in the following description.

DETAILED DESCRIPTION

Figure 1:
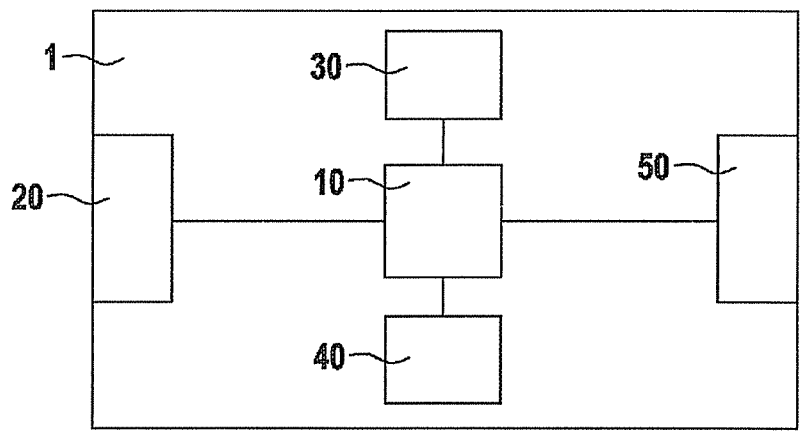
FIG. 1 shows a schematic block diagram of an exemplary embodiment of a camera according to the present invention.

The function of the camera according to the present invention is described in the following with reference to FIG. 1 and FIG. 2. As is apparent from FIG. 1, camera 1 according to the present invention according to the represented exemplary embodiment, includes an evaluation and control unit 10, an image capturing device 20, a storage unit 30, a sensor unit 40, and an operating unit 50.

Figure 2:
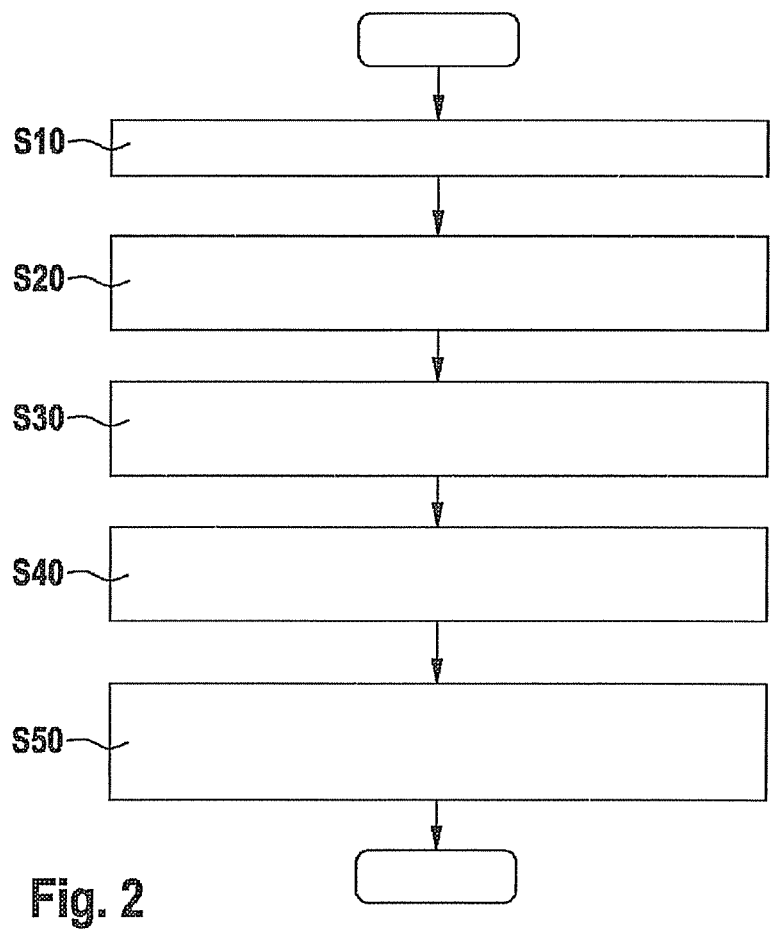
FIG. 2 shows a flow chart of a selection method according to the present invention of an object to be recorded which is carried out by the camera according to FIG. 1.

As is apparent from FIG. 2, camera 1 captures images in step S10 using image capturing device 20, the images being evaluated by evaluation and control unit 10. In this connection, evaluation and control unit 10 analyzes an image sequence recorded by image capturing device 20, the image sequence having at least two successively captured images, in order to segment and to stabilize at least one object to be recorded as a function of a panning movement of camera 1 during the image recording. For the analysis of the recorded image sequence, evaluation and control unit 10 ascertains in step S20 the deliberate panning movement of camera 1 during the image recording. Due to the various movement parameters such as amplitude, duration, direction, etc., the deliberate panning movement differs from non-deliberate camera movements such as wobbling, shaking, etc. In step S30, evaluation and control unit 10 ascertains movements of objects in the captured images. In step S40, evaluation and control unit 10 compares the ascertained object movements with the ascertained panning movement of camera 1. In step S50, evaluation and control unit 10 determines at least one object as an object to be recorded, the ascertained movement of which is most consistent with the ascertained panning movement of camera 1. Evaluation and control unit 10 thus determines the object as an object to be recorded, the ascertained movement of which has the greatest consistency with the ascertained panning movement of camera 1. Evaluation and control unit 10 subsequently stores an image section of the image captured by image capturing device 20 in storage unit 30, the stored image section representing the at least one object to be recorded. Since by manually tracking camera 1, the user attempts to hold the desired object nearly constantly in the image section to be recorded, the desired object has nearly the same movement parameters as camera 1, so that the camera movement may be used advantageously as a selection criterion. Since the manual tracking is not sufficiently precise and the image is often blurred during tracking, it is of particular benefit to stabilize the image section having the desired object to be recorded by using appropriate known stabilization methods.

For generating information concerning the panning movement of the camera and/or the movements of the objects in the captured images, evaluation and control unit 10 evaluates an optical flow which is ascertained by evaluation and control unit 10 using a digital evaluation of the recorded image sequence. Evaluation and control unit 10 is thus able to evaluate, for example, the optical flow of a recognized image background in order to generate information concerning the panning movement of camera 1. In addition or alternatively, evaluation and control unit 10 is able to receive information concerning the panning movement of camera 1 from sensor unit 40 which detects the panning movement of camera 1 using corresponding sensors. Sensor unit 40 may, for example, have inertial sensors which provide information concerning the panning movement of camera 1 via the detection of yaw rates. To make tracking of a desired object easier, the resolution of the images captured by image capturing device 20 is selected to be significantly greater than the resolution of the image sections to be stored in storage unit 30. In order to establish the image sections to be recorded or to be stored, evaluation and control unit 10 determines a focus of the at least one object to be recorded as a central point of the image section to be recorded, evaluation and control unit 10 scaling the size of the image section to be recorded to the size used in storage unit 30.

Camera 1 according to the present invention thus makes possible a stabilized tracking of a desired object by comparing the panning movement of camera 1 with the movement of objects in the image, it being possible for the camera movement to be measured using either the inertial movements or the optical flow. The objects may be segmented using the ascertained optical flow. The movements of the objects are measured for the purpose of stable tracking. From the analysis of the dense optical flow, evaluation and control unit 10 ascertains all objects in the captured images having different movements and the static background. However, since a plurality of objects having similar or different movements may be discovered in the captured images, the selection of the desired object is made by comparison with the panning movement of camera 1. If there is a plurality of objects having a comparable movement, the common focus of the selected objects may be used as a central point of the image section to be recorded and for stabilization and/or an object may be filtered out using a temporal filter. Alternatively, the desired object to be recorded could be selected in this case using operating unit 50.

In summary, camera 1 according to the present invention contains an image capturing device 20 having a significantly greater resolution than is necessary for recording image sequences. In these image sequences, the objects are segmented using their similar image flow, the desired movement of the object to be tracked being established via the panning movement of camera 1. To that end, the panning movement is determined using either inertial sensors (yaw rate) or using the image flow of the background (analysis of the intrinsic movement). If one or a plurality of objects moves according to the panning movement of camera 1, the common focus is selected as the central point of the image section to be recorded, i.e., the active image section is positioned in such a way that the object retains its absolute image coordinates, or the desired object may be filtered out using a temporal filter. If necessary, the size is tracked using automatic image scaling, making it possible to capture all objects of the desired direction of movement.

What is claimed is:

1. A camera, comprising:
   a camera arrangement having an image capturing device;
   an evaluation and control unit to analyze an image sequence having at least two successively captured images recorded by the image capturing device, in order to segment and to stabilize at least one object to be recorded during the image recording; and
   a storage unit;
   wherein the evaluation and control unit determines a panning movement of the camera arrangement and compares the panning movement with determined movements of a plurality of objects represented in the captured images, wherein the evaluation and control unit determines, based on the comparison, at least one object among the plurality of objects as the object to be recorded, wherein the determined movement of the at least one object is most consistent among the determined movements of the plurality of objects with the determined panning movement of the camera arrangement, and wherein the evaluation and control unit stores an image section of the image captured by the image capturing device in the storage unit which represents the at least one object to be recorded.

2. The camera of claim 1, wherein the evaluation and control unit digitally evaluates the recorded image sequence for determining an optical flow, and wherein the evaluation and control unit evaluates a determined optical flow to generate information concerning at least one of a panning movement of the camera and movements of the objects in the images.

3. The camera of claim 2, wherein the evaluation and control unit evaluates the optical flow of a recognized image background to generate information concerning the panning movement of the camera.

4. The camera of claim 1, further comprising:
a sensor unit to detect the panning motion of the camera, wherein the sensor unit transfers information concerning the panning movement of the camera to the evaluation and control unit.

5. The camera of claim 1, wherein a resolution of the images captured by the image capturing device is significantly greater than a resolution of the images stored in the storage unit.

6. The camera of claim 1, wherein the evaluation and control unit establishes a focus of the at least one object to be recorded as a central point of the image section to be recorded, and wherein the evaluation and control unit scales the size of the image section to be recorded to the size used in the storage unit.

7. A method for selecting an object to be recorded, the method comprising:
recording, by a camera, and analyzing an image sequence having at least two successively captured images to segment and to stabilize at least one object to be recorded in the captured images;
determining a panning movement of the camera during the image recording, wherein movements of a plurality of objects are determined in the captured images and compared with the panning movement of the camera, and wherein, based on the comparison, at least one object among the plurality of objects is determined as the object to be recorded, wherein the determined movement of the at least one object is most consistent among the determined movements of the plurality of objects with the determined panning movement of the camera; and
storing an image section of the captured images stored, wherein the image section represents the at least one object to be recorded.

8. The selection method of claim 7, wherein a focus of the object to be recorded is established as a central point of the image section to be recorded.

9. The selection method of claim 8, wherein at least one of the following is satisfied: (i) a common focus is established as a central point of the image section to be recorded, and (ii) an object is filtered out using a temporal filter if multiple objects are determined having the same direction of movement as the objects to be recorded.

10. The selection method of claim 7, wherein a resolution of the captured images is significantly greater than a resolution of the images stored in the storage unit.

\* \* \* \* \*

UNITED STATES PATENT AND TRADEMARK OFFICE
CERTIFICATE OF CORRECTION

PATENT NO. : 8,605,950 B2  Page 1 of 1
APPLICATION NO. : 13/120865
DATED : December 10, 2013
INVENTOR(S) : Joecker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

Signed and Sealed this
Twenty-second Day of September, 2015

Michelle K. Lee
*Director of the United States Patent and Trademark Office*